INVENTOR
G.E.BERGGREN
BY
ATTORNEY

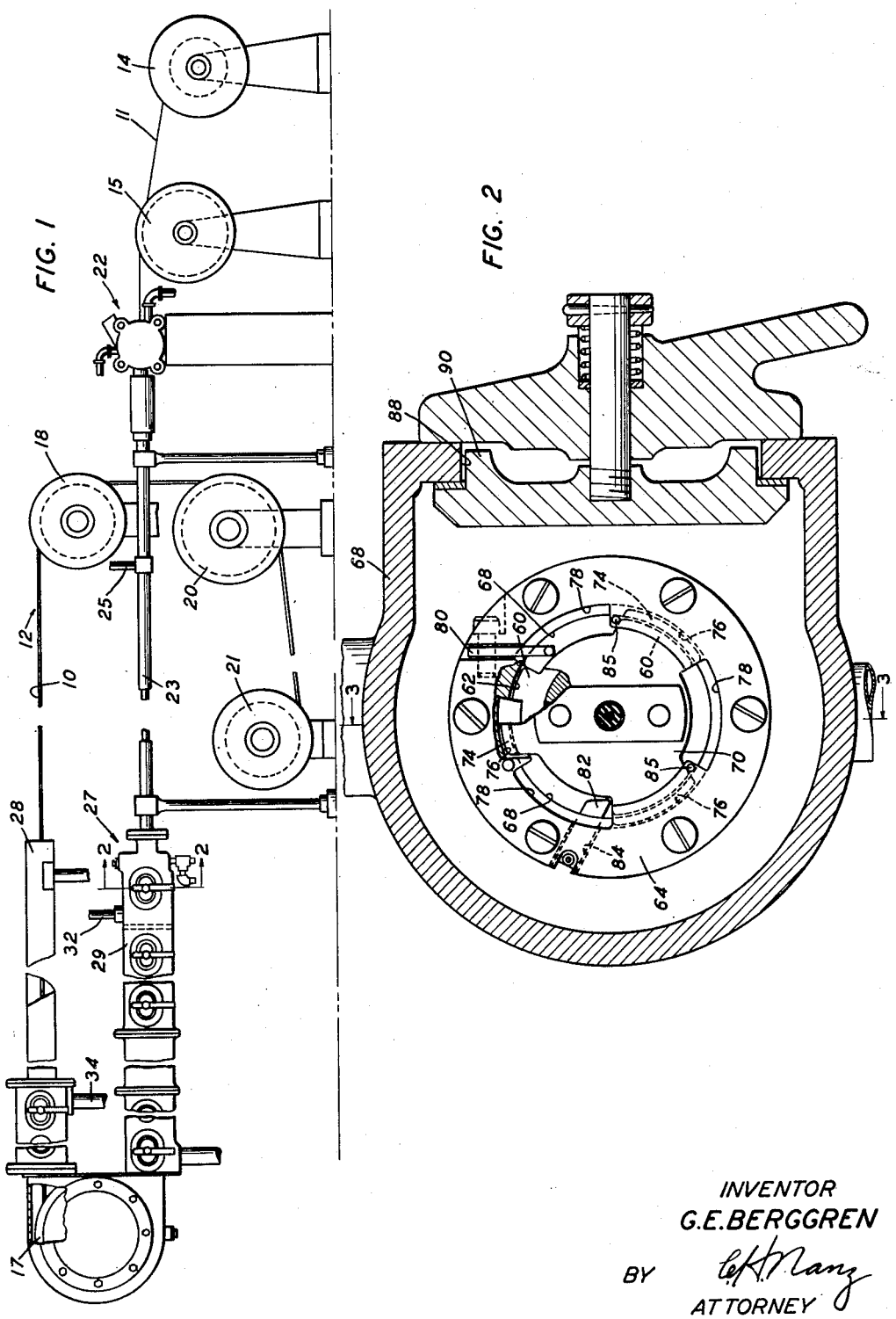

Patented July 4, 1950

2,513,781

UNITED STATES PATENT OFFICE 2,513,781

APPARATUS FOR CONTINUOUSLY MAKING VULCANIZED ARTICLES

George E. Berggren, Baltimore, Md., assignor to Western Electric Company, Incorporated, New York, N. Y., a corporation of New York Application December 6, 1947, Serial No. 790,109

3 Claims. (Cl. 18—12)

1

This invention relates to apparatus for continuously making vulcanized articles, and more particularly to apparatus for straining debris from fluids flowing out of vulcanizing tubes.

In the manufacture of articles having vulcanized coverings around filamentary cores, such cores are sometimes passed through an extruder which extrudes coverings of vulcanizable material thereover, and then are passed through a vulcanizing tube into which steam is introduced under high pressure to vulcanize the coverings. Such apparatus is sometimes provided with a pressure cooling and sealing unit positioned in tandem with the vulcanizing tube into which unit cold water under pressure is introduced to cool the article and to prevent the escape of steam from the vulcanizing tube. When a drain pipe is connected to the vulcanizing tube near the cooling and sealing unit to drain condensate from the vulcanizable tube and any water entering the vulcanizing tube from the cooling and sealing tube, it is essential that such drainage water and condensate be strained to prevent clogging of the drain pipe by debris in the vulcanizing tube. In the past, there has been no strainer which would strain the condensate without clogging, and when the strainer clogs there is great danger of flooding the vulcanizing tube with condensate and water from the cooling and sealing unit.

An object of the invention is to provide new and improved apparatus for continuously making vulcanizing articles.

A further object of the invention is to provide new and improved non-cloggable apparatus for straining debris from fluids flowing from a vulcanizing tube into a drain.

An apparatus illustrating certain features of the invention includes a vulcanizing tube, a drain pipe connected to the tube, and a generally cylindrical strainer positioned between the drain pipe and the interior of the tube.

A complete understanding of the invention may be obtained from the following detailed description of an apparatus forming a specific embodiment thereof, when read in conjunction with the appended drawings, in which:

Fig. 1 is a fragmentary side elevation of a portion of an apparatus illustrating certain features of the invention;

Fig. 2 is an enlarged vertical section taken along line 2—2 of Fig. 1;

2

Figure 3:
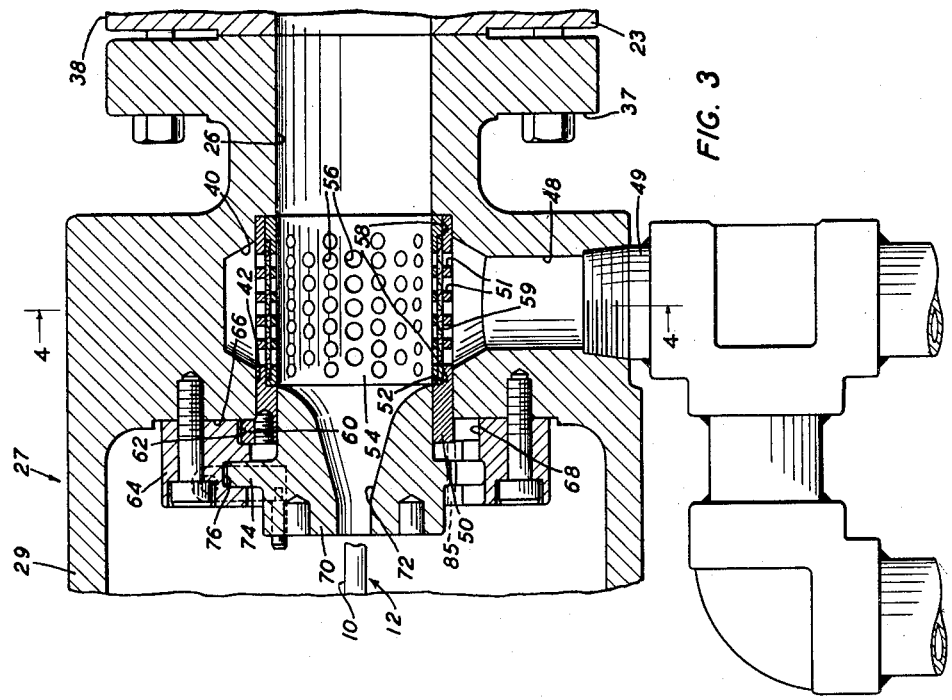
Fig. 3 is an enlarged fragmentary vertical section taken along line 3—3 of Fig. 2, and, Fig. 4 is an enlarged fragmentary vertical section taken along line 4—4 of Fig. 3.
Figure 4:
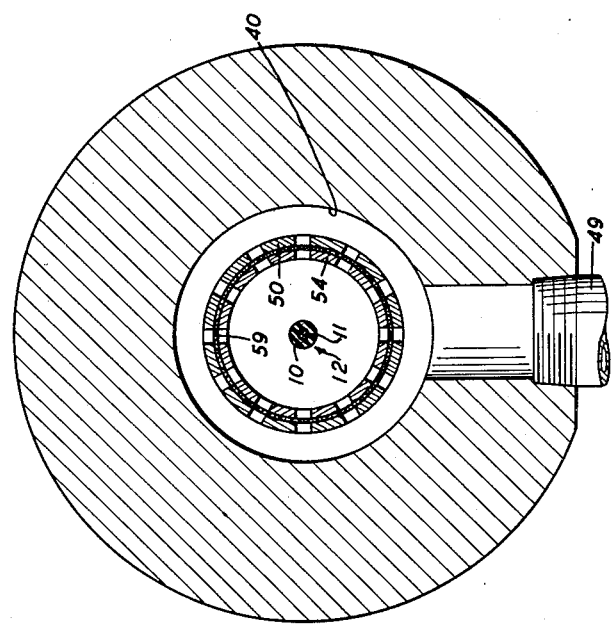

Referring now in detail to the drawings there is shown therein a continuous extruding and vulcanizing machine for forming and vulcanizing a protective covering 10 (Fig. 1) around a filamentary core 11 to form a filamentary article 12. In forming the covering upon the core 11, the core is advanced continuously from a supply reel 14 at a high rate of speed by a supply capstan 15, and is advanced continuously by the takeup capstan 20 from the supply capstan 15 around sheaves 17 and 18 to a takeup reel 21. As the core 11 is drawn from the supply capstan 15 it passes through an extruder 22 which extrudes the covering 10 composed of a vulcanizable compound thereover.

The supply capstan 15, the extruder 22 and the takeup capstan 20 are disclosed and claimed in copending application Serial No. 697,809, filed September 8, 1946 by D. D. Jones for "Apparatus for Covering Cores."

The resulting filamentary article passes into the vulcanizing tube 23 which has steam under a high pressure supplied thereto by a steam pipe 25, whereby the covering of the vulcanizable compound is vulcanized as it is advanced through the vulcanizing tube. The resulting article 12 passes from the vulcanizing tube into and through a chamber 26 formed in the right hand end of a hollow casting 29 of a pressure cooling and sealing unit 27, as viewed in Fig. 3, and through the cooling and sealing unit 27 to a cooling trough 28 to which cold water is supplied. The chamber 26 forms a continuation of and communicates with the vulcanizing tube. A supply pipe 32 supplies cold water under high pressure to the cooling and sealing unit, and a drain pipe 34 drains the water from the cooling and sealing unit.

The cooling and sealing unit 27 is substantially identical with that disclosed and claimed in copending application Serial No. 749,826, filed May 22, 1947, by G. E. Berggren and L. W. Lovett for "Apparatus for Continuously Making Vulcanized Articles," except for the portion thereof shown in Fig. 3.

The hollow casting 29 has a flange 37 bolted to a flange 38 of the vulcanizing tube 23 to connect the cooling and sealing unit to the vulcanizing tube. The casting 29 also is provided with an annular groove 40 extending around a counter bore 42 formed therein. A tapped bore 48 connects the annular groove 40 to a drain pipe 49 which is threaded into the tapped bore 48 and connects the bore 48 to a steam trap of conventional design (not shown).

A hollow cylindrical backing plate 50 having perforations 51—51 therein is provided with a counterbore 52 into which an inner cylindrical backing plate 54 fits. The backing plate 54 is provided with perforations 56—56 and annular ribs 58—58 for spacing the backing plates 50 and 54 apart to provide space for a cylindrical screen 59. The backing plate 50 is provided with arcuate lugs, of which an arcuate lug 60 is shown, which are designed to fit into arcuate slots, of which an arcuate slot 62 is shown, formed by a locking ring 64 and a wall 66 of the casting 29. The backing plates and the screen may be slid to the left, as viewed in Fig. 3, after rotating the plate 50 to a position in which the arcuate lugs 60—60 correspond with openings 68—68 formed in the locking ring 64.

A gland 70 is provided with arcuate lugs 74—74 (Figs. 2 and 3), which are designed to enter arcuate slots 76—76 formed in the locking ring 64. The gland 70 also may be rotated from the position in which it is shown in Fig. 2 to move the arcuate lugs 74—74 along arcuate grooves 76—76 into alignment with arcuate openings 78—78, which are aligned with the arcuate openings 68—68. A key 80 serves to lock the gland 70 against rotation in one direction with respect to the locking ring 64, and a key 82 projecting through a slot 84 formed in a locking ring 64 to prevent rotation in that direction between the straining plate 50 and the locking ring 64. Pins 85—85 prevent rotation in the opposite direction.

The casting 68 is provided with an opening 88, which may be quickly opened by a closure plate to provide access to the interior of the casting 36 when it is desired to remove the gland 70, the backing plates and the screen from the mixing chamber 26 for cleaning debris out of the backing plate 54 and the screen and for stringing the core 11 through the apparatus.

*Operation*

In the operation of the apparatus described hereinabove, the covered article 12 is advanced from the vulcanizing tube 23 into and through the chamber 26, the backing plate 54 and the gland 70 into the interior of the casting 29. Any water flowing into the chamber 26 through the gland 70, and steam condensate flowing from the vulcanizing tube into the chamber 26, are drained through the backing plate 50, the screen 59 and the backing plate 54 into the annular groove 40, from which they flow through the opening 48 into the drain pipe 49 to a steam trap (not shown). No debris which is carried into the chamber 26 by the covered article 12 and settles on the backing plate 54 and the screen 59 is permitted to enter the manifold 40. Since the backing plates 50 and 54 and the screen 59 are cylindrical, the debris collected on the plate 50 and the screen never clogs the entire areas thereof and the water and steam are always free to pass through the strainer.

The above-described strainer is substantially non-cloggable and may be easily assembled and disassembled for cleaning. Since the plates 50 and 54 and the screen 59 are cylindrical, they are substantially non-cloggable and water and steam may pass through portions of straining areas thereof even if the plate 54 and the screen are partially clogged by a debris accumulated thereon.

What is claimed is:
1. A continuous extrusion and vulcanization apparatus, which comprises a tube provided with a socket in one end thereof coaxial with the remainder thereof, a drain pipe connected transversely to the socket, a generally cylindrical strainer having a locking element formed thereon and designed to fit into the socket for separating the drain pipe from the interior of the tube, a gland having a locking element formed thereon and designed to fit into one end of the strainer, and a locking ring having formed thereon a locking element for engaging the locking element on the strainer and also being provided with a second locking element for engaging the locking element on the gland.

2. A continuous extrusion and vulcanization apparatus, which comprises a tube provided with a necked down portion, said necked down portion having a socket formed coaxially therein and also being provided with an annular passage coaxial therewith, said necked down portion also being provided with a transverse outlet in communication with the annular passage, a locking ring provided with two sets of lugs and secured against axial movement at one end of the necked down portion, a cylindrical strainer provided with a plurality of lugs and designed to fit into the necked down portion, said lugs of the strainer serving to interlock with one set of lugs of the locking ring, and a bushing having a plurality of lugs and designed to fit into one end of the strainer, said lugs of the bushing serving to interlock with the other set of lugs of the locking ring.

3. A continuous extrusion and vulcanization apparatus, which comprises a tube provided with a necked down portion, said necked down portion having a socket formed coaxially therein and also being provided with an annular passage coaxial therewith, said necked down portion also being provided with a transverse outlet in communication with the annular passage, a locking ring provided with two sets of lugs and secured against axial movement at one end of the necked down portion, a cylindrical strainer provided with a plurality of lugs and designed to fit into the necked down portion, said lugs of the strainer serving to interlock with one set of lugs of the locking ring, a bushing having a plurality of lugs and designed to fit into one end of the strainer, said lugs of the bushing serving to interlock with the other set of lugs of the locking ring, and means for preventing rotation of the strainer and the bushing with respect to the tube.

GEORGE E. BERGGREN.

REFERENCES CITED

The following references are of record in the file of this patent:

UNITED STATES PATENTS

| Number | Name | Date |
| --- | --- | --- |
| 2,291,344 | Powell | July 28, 1942 |
| 2,373,816 | De Rocke et al. | Apr. 17, 1945 |

FOREIGN PATENTS

| Number | Country | Date |
| --- | --- | --- |
| 580,870 | France | Nov. 18, 1924 |